Patented June 29, 1943

2,322,779

UNITED STATES PATENT OFFICE 2,322,779

RUBBER PRODUCT

William S. Gocher, Fairfield, and Alfred J. Jennings, Bridgeport, Conn., assignors to E. I. du Pont de Nemours & Company, Wilmington, Del., a corporation of Delaware No Drawing. Application March 14, 1941, Serial No. 383,416

11 Claims. (Cl. 117—76)

This invention relates to rubber articles and more particularly to improvements in surface-coated rubber products.

A large variety of film-forming materials, including cellulose esters, oil varnishes, shellac, phenol-aldehyde and other synthetic resinous compositions have been used as protective and decorative coatings on rubber surfaces. In spite of the large amount of work done in this field the coated rubber products previously available have been deficient in one or more of the requirements of flexibility, adhesion of the finish to the rubber base, insufficient toughness, as evidenced by cracking on bending, and poor durability on outdoor exposure. Coatings drying by oxidation, e. g. those containing drying oils, continue to polymerize and oxidize after application with resultant loss in elasticity. Antioxidants present in the rubber undesirable prolong drying time of such coating compositions and driers added to the coating composition to accelerate drying, adversely affect the aging properties of the rubber base.

Some improvement is obtained with coatings drying solely by solvent evaporation but those which will adhere to the rubber do not withstand the degree of scrubbing and flexing required in upholstery and other fabrics subject to severe usage.

Phenol-aldehyde resin compositions adhere satisfactorily to rubber for some purposes, but such coatings lack the high adhesion, scratch and abrasion resistance required in upholstery materials designed for severe usage. In addition, phenol-aldehyde resins are generally not sufficiently flexible to use as rubber coatings.

The high molecular weight polyamides because of their extensibility and flexibility are desirable coatings for rubber, and are satisfactory in some applications, as for instance for rubber footwear. The films, however, lose adhesion after continued severe usage. Also many of the polyamides which are most desirable because of flexibility are not sufficiently hard to have satisfactory resistance to scuffing and abrasion.

This invention has as an object the production of rubber articles having an improved finish. A further object is the manufacture of artificial leather products comprising rubber coated fabrics, the rubber surface of which carries a strongly adherent protective coating which is highly resistant to abrasion. Other objects will appear hereinafter.

The above objects are accomplished by applying to rubber articles, and particularly to rubber coated fabrics, a coating of a composition comprising a high molecular weight polyamide and a phenol-aldehyde resin. The rubber articles thus obtained, as compared to the similar previous products coated with either of these ingredients, are markedly improved with regard to adherence of the coating, water-resistance, hardness, wearing qualities, abrasion resistance, and appearance.

With regard to the phenol-aldehyde resin constituent, the best adhesion is obtained by using the thermosetting resins prepared from phenols, such as 2,2-di-(4-hydroxyphenyl)-propane, having three or more reactive positions. By the term "reactive positions" is meant unsubstituted carbon atoms, i. e. holding a hydrogen atom, ortho or para to a phenolic hydroxyl group. Phenol itself and meta-cresol have three reactive positions, while para-cresol has only two. Some improvement in adhesion over that obtained by using either the resin or polyamide alone is obtained, however, by using in admixture with the polyamide a thermoplastic phenol-aldehyde resin, that is, resins prepared from phenols having one or two reactive positions.

The polyamides used in the present compositions are of the general type described in U. S. Patents 2,071,253 and 2,130,948. The polymers there described are high molecular weight products which are generally crystalline in structure, showing X-ray powder diffraction patterns in the massive state, and which are capable of being cold drawn into fibers showing by characteristic X-ray patterns molecular orientation along the fiber axis.

These polyamides, generally speaking, comprise the reaction product of a polyamide-forming composition in which the molecules are bifunctional and contain two amide-forming groups, each of which is complementary to an amide-forming group in other molecules in said composition.

These polyamides can be obtained, for example, by self-polymerization of monoaminomonocarboxylic acids, or by reacting a diamine with a dibasic carboxylic acid in substantially equimolecular amounts, it being understood that reference herein to the amino acids, diamines, and dibasic carboxylic acids is intended to include the equivalent amide-forming derivatives thereof.

These linear polyamides include also polymers obtained by admixture of other linear polymer-forming reactants, as for instance glycols in the case of polyester amides, with the mentioned polyamide-forming reactants. In either instance the amide group is an integral part of the main chain of atoms in the polymer, and in the case of the preferred fiber-forming polyamides, the average number of carbon atoms separating the amide groups is at least two. On hydrolysis with hydrochloric acid the amino acid polymers yield the aminohydrochloride, and the diamine-dibasic acid polymers yield the diamine hydrochloride and the dibasic carboxylic acid.

The coating can be applied to the rubber as a molten mixture of the resin and polyamide, but the most generally satisfactory method consists of applying a solution containing the polyamide and phenol-aldehyde resin and removing the solvent by evaporation. In the case of the simple polyamides the solutions for the most part are restricted to those in phenol or in the lower fatty acids such as formic and acetic acids. The preferred polyamides are those which dissolve in a wider range of the common more volatile solvents. Polyamides of this kind are: (a) those prepared from diamines and dicarboxylic acids one or both of which contain a hydrocarbon substituent in the chain of atoms separating the amide-forming groups; (b) interpolyamides prepared from a mixture of different polyamide-forming compositions, for example, the interpolyamides prepared from an equimolar mixture of hexamethylenediamine, decamethylenediamine, adipic acid, and sebacic acid; and the interpolyamides obtained from mixtures of diamines, dibasic acids and amino acids or lactams; (c) interpolymers obtained from a polyamide-forming composition containing in addition to polyamide-forming reactants other linear polymer-forming reactants, for example, the polymer obtained by condensing 15 parts of hexamethylene diammonium adipate with 85 parts of an equimolar mixture of ethylene glycol and adipic acid.

The most satisfactory solvents from practical and economic considerations are aqueous ethanol solutions. Other useful solvents include equi-volume mixtures of chloroform and methanol or higher alcohols. In general, thermoplastic phenol-aldehyde resins and, in the heat-reactive series, lowly condensed products known as "resoles" are also soluble in such solvents so that no difficulties are encountered in obtaining solutions of the combinations. In order to use more highly condensed phenol-aldehyde resins, it is necessary to use emulsions or dispersions.

The solutions of the polyamide and phenol-aldehyde resin can be applied by the ordinary methods of brushing, spraying, doctor coating, dipping, etc. When a molten mixture of the polyamide and resin is used the melt can be extruded on the rubber, or the article dipped into the melt. When melts are employed, the temperature of the melt is usually above the point at which thermosetting phenol-aldehyde resins harden so that in such cases it is usually best to employ thermoplastic phenol-aldehyde resins. Another method that can be applied, particularly to rubber in sheet form consists in pressing a preformed film or sheet of the polyamide-resin blend onto the rubber. In some cases it is possible to calender combinations of polyamides with phenol-aldehyde resins onto a rubberized fabric.

The products of this invention can be further improved by treating the polyamide-phenol-aldehyde resin coat with sulfur chloride or other rubber-hardening agent. When desired a hardening treatment can be applied directly to the vulcanized or unvulcanized rubber.

The invention is further illustrated by the following examples in which the parts are by weight.

Example I

A dispersion of the polyamide and phenol-aldehyde resin in a mixture of volatile organic solvent, water, and dispersing agent is obtained by the following mixture with gentle warming:

| | Parts |
|---|---|
| Polyamide | 72 |
| Phenol-formaldehyde resin | 48 |
| Butyl phthallyl butyl glycollate | 6 |
| Diphenyloloctadecane | 9 |
| Denatured alcohol | 432 |
| Water | 48 |

When solution is complete the solution is placed in a ball mill, 72 parts of titanium dioxide are added and dispersion effected by grinding for 12 hours. An unpainted golf ball which has been chlorine treated in a known manner is coated with this enamel by dipping. The coating is dry and tack-free at the end of ½ hour.

The resin used in the above example is a commercial heat-reactive phenol-formaldehyde resin sold by the Bakelite Corporation under the code BV-1680. The polyamide is an interpolyamide obtained by heating at 200° to 220° C. for three hours 40 parts of hexamethylene diammonium adipate, 30 parts hexamethylene diammonium sebacate, and 30 parts caprolactam.

After the above golf ball is used for 18 holes of play there is no sign of peeling of the polyamide coating. The adhesion is still excellent and it is not possible to peel the coating from the ball by soaking in water or even scraping with a knife. Compared with a golf ball having a conventional oil-base enamel coating, the ball in this example is more scuff resistant and cleans more easily.

The durability of the coating and the short drying time are particularly advantageous in articles of this kind. An equivalent unpainted golf ball coated with an oil-base enamel, which dries on glass in less than 4 hours, requires 18 hours to dry tack free on the ball due to the inhibiting effect of antioxidants in the rubber. The coating described in the example is also desirably used on rubber since the solvents do not soften rubber as is the case with oil-base enamels using hydrocarbon solvents which soak into the surface of the golf ball making it soft and requiring an extremely long time for the ball to obtain proper hardness.

Example II

The polyamide-resin composition described below is applied to a rubberized fabric of the "leatherette" type consisting of a fabric base to which is calendered a compounded rubber coat. After vulcanization of the rubber coat a solution obtained by warming and stirring the following ingredients is applied over the rubber coat.

| | Parts |
|---|---|
| Polyamide | 140 |
| 2,2-di-(4-hydroxyphenyl)-propane-formaldehyde resole (50% solids solution) | 140 |
| Denatured alcohol | 1392 |
| Water | 348 |
| 85% phosphoric acid | 1 |

After brushing the solution on the rubberized fabric the product is festooned and heated for 15 minutes at 240° F. The coated surface is then given a treatment with sulfur chloride by brushing with a 6% solution of sulfur chloride in carbon tetrachloride and finally placed in an atmosphere of ammonia to effect neutralization.

On vigorous scrubbing by hand the film in this case has perfect adhesion. A corresponding film having a coating of polyamide alone can be peeled from the rubber base after vigorous scrubbing. The finished leatherette material has a brilliant luster and excellent appearance. It is remarkably resistant to perspiration and color cannot be rubbed off after exposure or after being worn for a long period of time. These latter properties enhance the value of the product as a material for fabricating garments, such as leather jackets.

The polyamide used in this example is prepared by condensing 60 parts of hexamethylene diammonium adipate with 40 parts of caprolactam by heating under pressure at 250–260° C. for 5 hours and then for 3 hours under a vacuum of 10–22 mm. to remove the water formed in the condensation.

The phenol-formaldehyde resin is prepared by heating with stirring

| | Parts |
|---|---|
| 2,2-di-(4-hydroxyphenyl)-propane | 228 |
| 37% aqueous formaldehyde solution | 280 |
| 50% aqueous sodium hydroxide | 10 |

The phenol used in the above example, which for best results should be used in relatively pure state, can be prepared by known methods by condensing 2 moles of phenol with one mole of acetone. In the reaction of 2,2-di-(4-hydroxyphenyl)-propane with formaldehyde, it is important that the reaction be stopped at the proper point. If it is carried too far, the resin becomes less compatible with other resinous materials while if it is not carried far enough, the yield of resin is cut down by solution in the wash water. The desired degree of condensation can be obtained by the following procedure. The above mixture is reacted at a temperature from 80° to 95° C. until a sample of the cooled reaction mixture becomes clear again at a temperature of 45° to 55° C. If the reaction is carried out at 80° C., the time required for this point to be reached is approximately 2½ hours; if the reaction is carried out at 95° C., the time required is approximately ½ hour. When the clear point of the reaction mixture has reached the desired point, the reaction is stopped by the addition of 750 parts of cold water. The reaction mixture is then neutralized with dilute hydrochloric acid, the resin layer is washed by stirring for ½ hour, the water is siphoned off, and the washing process repeated twice more with 750 parts of cold water. The excess water is then removed by warming the resin to 50° to 60° C. under 10–20 mm. pressure. After the water has been removed, 250 parts of denatured alcohol are added to give a resin solution containing approximately 50% solids.

Example III

A rubberized fabric is prepared by coating cotton sateen with an anchor coat of rubber cement followed by a calender coat of a rubber stock comprising a properly formulated mixture of pale crepe rubber, pigment, fillers, sulfur, accelerator, and antioxidant. The rubber surface of the coated fabric is embossed and then heated to vulcanize the rubber.

A solution in 100 parts denatured alcohol of 50 parts polyester-amide and 100 parts of the phenolic resin described in Example II is brushed on the rubber surface of the fabric and baked for 15 minutes at 240° F. Slightly improved toughness, and abrasion resistance as well as a lower luster are obtained by brushing the surface with a 6% solution of sulfur chloride in carbon tetrachloride, followed by storage in an atmosphere of ammonia. A still more abrasive resistant product is obtained if the rubber base is treated with sulfur chloride prior to application of the coating composition.

The polyester-amide mentioned in this example is made by heating 15 parts of hexamethylene diammonium adipate with 85 parts of an equimolecular mixture of ethylene glycol and adipic acid for 17 hours at 150° C. at atmospheric pressure, then 4 hours at 200° C. at atmospheric pressure, then 4 hours at 200° C. at 20 mm., and finally for 96 hours at 2 mm. pressure.

The surface coated rubberized fabric of the above example is abrasion resistant and has good surface characteristics for use as an upholstery material. Scrubbed in the mechanical scrub test device (Automotive Industries 49, pages 1262–6), the coating is still adherent after 2,000 strokes. A similar product in which the film is composed entirely either of polyamide or phenol-aldehyde resin fails completely at the end of 2,000 strokes.

Example IV

A hospital sheeting is made by the following procedure: To a rubberized fabric, obtained by applying rubber cement to both sides of a silk fabric, is applied a solution in 400 parts of denatured alcohol and 100 parts of water of 100 parts of the polyamide described below and 50 parts of the 2,2-di-(4-hydroxyphenyl)-propane-formaldehyde resole described in Example II.

The above polyamide is prepared by heating 60 parts of hexamethylene diammonium adipate and 40 parts of a salt prepared from equimolecular parts of piperazine and sebacic acid. The heating schedule consists of 3 hours at 200° C. and 3 hours at 250° C., both at atmospheric pressure, followed by 3 hours at 250°–255° C. under 10–20 mm. vacuum.

The solution is applied to one side of the rubberized fabric by means of a dull doctor knife. After drying at room temperature for 24 hours the film has excellent adhesion to the rubber base, much better than a corresponding film from which the phenol-formaldehyde resole has been omitted. The coated side of the hospital sheeting is very resistant to vegetable and mineral oils.

Example V

An automobile tire, improved by a side wall coating of high scuff resistance, is obtained by applying to the side wall the solution indicated below.

| | Parts |
|---|---|
| Polyamide of Example I | 72 |
| 2,2-di-(4-hydroxyphenyl)-propane-formaldehyde resin of Example II | 48 |
| Butyl phthallyl butyl glycollate | 18 |
| Diphenyloloctadecane | 27 |
| Denatured alcohol | 452 |
| Water | 48 |
| Titanium dioxide | 72 |

The coating is quite flexible, and the paint adheres to the tire even after several months. Compared with a commercial side wall tire paint, the product of the example has a number of advantages: (1) it dries much faster; (2) it has much better abrasion resistance so that there is damage to a lesser extent when the tire is brushed against a curbing; (3) it chalks less—this is an improvement over the commercial product particularly in that when the wheel is washed pigment does not wash onto the spokes of the wheel leaving a white film; and (4) it sets up on a new tire whereas commercial preparations are not suited for use on new tires because the antioxidant in the rubber prevents drying. The commercial product is usable only on older tires.

Other examples of suitable polyamides are polytetramethylene sebacamide, polypentamethylene adipamide, polypentamethylene sebacamide, polyhexamethylene suberamide, polyhexamethylene sebacamide, polyoctamethylene adipamide, polydecamethylene carbamide, poly-p-xylylene sebacamide, polyphenylene diacetamide, the polyamide derived from 3,3'-diaminodipropyl ether and adipic acid, the polyamide derived from piperazine and sebacic acid, and the polyamide derived from ethylenediamine and sebacic acid. Polymerized 6-aminocaproic acid, polymerized 9-aminononanoic acid, polymerized 11-aminoundecanoic acid, and 12-aminostearic acid are additional examples of linear polyamides which may be used. Mixtures of any of the polyamides disclosed herein can be used. The modified polyamides previously mentioned such as the polyester-amides and the polymer obtained from hexamethylene diamine, adipic acid and 2,2-dimethyl-1,3-propanediol, are particularly useful. Other polymers of this kind are described in U. S. Patents 2,224,037 and 2,130,948. Polyamides having a relatively high intrinsic viscosity, as defined in the last mentioned patent, are preferred. For the present purpose the best results are obtained with intrinsic viscosities between 0.6 and 2.

The most suitable phenol-aldehyde resins for use in the coating compositions described in the present invention are those prepared by condensing formaldehyde with a phenol having three or more reactive positions. As examples of such phenols may be mentioned phenol itself, meta-cresol, 2,2-di-(4-hydroxyphenyl)-propane, 1,1-di-(4-hydroxyphenyl)-cyclohexane, p,p'-dihydroxydiphenyl, resorcinol, sym.-xylenol. Of the heat reactive resoles, those prepared from dihydric phenols having four reactive positions, e. g. 2,2-di-(4-hydroxyphenyl)-propane, are the most suitable. Heat reactive resoles of this kind are obtained by reacting formaldehyde with a dihydric phenol obtained by condensing a phenol having unsubstituted ortho and para positions with a ketone. The phenolic resin is preferably present in amount from 10% to 40% based on the weight of the polyamide and resin. Insoluble phenol-aldehyde resins can be employed in the form of emulsions or dispersions preferably with emulsions and dispersions of polyamides. Thermoplastic phenol-aldehyde resins may also be used. In place of formaldehyde other aldehydes can be used, e. g. propionaldehyde, butyraldehyde, furfuraldehyde, etc. The preferred aldehyde is formaldehyde. Although it is not essential for the purposes of this invention, it is desirable that the polyamide and the phenol-aldehyde resin yield compatible films on air drying and also on baking. Such clear films usually have better physical properties than opaque, incompatible films.

The coating composition can include in addition to the polyamide and the phenol-aldehyde resins a variety of other materials such as other resins, fillers, dyes, extenders, plasticizers, pigments, catalysts, antioxidants, etc. As catalysts to promote rapid hardening of the phenol-aldehyde resin any of the materials usually employed in phenol-aldehyde resins can be used, for example hexamethylenetetramine, oxalic acid, or phosphoric acid. It has been found particularly advantageous to use phosphoric acid in formulating these resinous compositions since coating compositions of lighter color result.

Pigmented compositions are particularly suitable because they have better durability than unpigmented films. It is also possible, using pigmented films, to obtain brighter and deeper colors than can be obtained with rubber compounds or rubber compounds having a coating of a clear lacquer.

The coating compositions can be applied from solutions, from emulsions or dispersions, or from melts by dipping, roller coating, doctor coating, spraying, or brushing. The films applied can vary in thickness from 0.0001 to 0.003 inch, the usual thickness being in the neighborhood of one mil.

The adhesion to rubber of the polyamide-phenol-aldehyde resin composition is improved by baking and this constitutes a preferred embodiment of this invention. The baking temperature can vary over a wide range depending on whether or not a catalyst is used. The time can also vary over a wide range. At lower temperatures (90° to 100° C.) the baking may extend over periods of several hours, while at higher temperatures a few minutes is sufficient. The time and temperature of the bake must be such that the rubber is not degraded. Radiant heat has been found particularly suitable for baking the films. A particularly suitable method of use of this invention is to apply the coating to unvulcanized rubber and then to vulcanize the rubber and bake the resinous coating in the same heating operation.

The rubber articles which are coated in this invention can contain the usual compounding ingredients such as zinc oxide, sulfur, accelerators, carbon black, softeners, antioxidants, fillers, modifying agents, etc.

The coating compositions of this invention can also be applied to rubber surfaces which have been partially coated with other resinous films. Thus, two-tone products can be obtained by applying a base color coat to the embossed fabric, scraping the enamel from the ridges of the embossing, drying, and then applying a clear coat of a composition coming within the scope of this invention over the base color coat.

The surface coated rubber products described herein exhibit markedly improved adherence of the coating, hardness, abrasion, oil, water, and scuff resistance over products coated with either phenol-aldehyde resins alone or with polyamides alone. The unusually good elastic properties of the polyamides are retained so that the combination is exceptionally suited to resist the strain produced by bending the rubber. The combination is more water-resistant and more oil resistant than the unmodified polyamides.

The products of this invention are useful in a large number of applications. These include coatings for such rubber articles as balloon fabrics, upholstery materials, patent leather substitutes, chemically resistant aprons, raincoat and hospital sheeting; molded rubber articles, particularly those subjected to oils or sunlight and outdoor exposure such as engine mounts, windshield wipers, and other molded rubber articles on automobiles and aeroplanes; conduits for organic liquids particularly liquids which attack rubber such as gasoline hose and tubing for dispensing fuel oil; and rubber coated insulated electrical conductors. In addition to these uses, the present coatings are valuable in side wall tire paints and golf ball paints and also as lacquers for rubber footwear.

As many apparently widely different embodiments of this invention may be made without departing from the spirit and scope thereof, it is to be understood that we do not limit ourselves to the specific embodiments thereof except as defined in the appended claims.

We claim:

1. An article of manufacture comprising a rubber article carrying an adherent film comprising a mixture of synthetic linear polyamide and a phenol-aldehyde resin, said polyamide being capable of being cold drawn into fibers which show by characteristic X-ray patterns orientation along the fiber axis.

2. An article of manufacture comprising a rubber coated fabric, the rubber surface of which carries an adherent flexible baked film comprising a mixture of synthetic linear polyamide and a phenol-aldehyde resin, said polyamide being capable of being cold drawn into fibers which show by characteristic X-ray patterns orientation along the fiber axis.

3. The article set forth in claim 1 in which said resin is the reaction product of formaldehyde and a phenol having at least three reactive positions.

4. The article set forth in claim 2 in which said resin is the reaction product of formaldehyde and a phenol having at least three reactive positions.

5. The article set forth in claim 1 in which said polyamide is that obtained by reacting a diamine, a dibasic carboxylic acid, and a monoaminomonocarboxylic acid.

6. The article set forth in claim 1 in which said polyamide is an ester-amide interpolymer obtained by reacting a diamine, a dibasic carboxylic acid, and a glycol.

7. The article set forth in claim 2 in which said polyamide is that obtained by reacting a diamine, a dibasic carboxylic acid, and a monoaminomonocarboxylic acid.

8. The article set forth in claim 2 in which said polyamide is an ester-amide interpolymer obtained by reacting a diamine, a dibasic carboxylic acid, and a glycol.

9. The article set forth in claim 1 in which said phenol-aldehyde resin is the reaction product of formaldehyde and 2,2-di-(4-hydroxyphenyl)-propane.

10. The article set forth in claim 2 in which said phenol-aldehyde resin is the reaction product of formaldehyde and 2,2-di-(4-hydroxyphenyl)-propane.

11. The article set forth in claim 2 in which said baked film comprises a pigmented mixture of synthetic linear polyamide and a phenol-aldehyde resin.

WILLIAM S. GOCHER.
ALFRED J. JENNINGS.